(12) United States Patent
Lien et al.

(10) Patent No.: US 7,373,486 B2
(45) Date of Patent: May 13, 2008

(54) PARTIALLY DECODED REGISTER RENAMER

(75) Inventors: Wei-Han Lien, San Jose, CA (US); John K Yong, Sunnyvale, CA (US); Shyam Sundar, Sunnyvale, CA (US); Rajat Goel, Santa Clara, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 141 days.

(21) Appl. No.: 11/214,193

(22) Filed: Aug. 29, 2005

(65) Prior Publication Data

US 2007/0050602 A1 Mar. 1, 2007

(51) Int. Cl.
*G06F 9/30* (2006.01)
*G06F 9/40* (2006.01)
*G06F 15/00* (2006.01)

(52) U.S. Cl. ...................... 712/218; 712/216
(58) Field of Classification Search ......... 712/217–218
See application file for complete search history.

(56) References Cited

U.S. PATENT DOCUMENTS

| | | | |
|---|---|---|---|
| 5,546,597 A * | 8/1996 | Martell et al. ............... 712/23 |
| 5,659,721 A | 8/1997 | Shen et al. |
| 5,682,492 A * | 10/1997 | McFarland et al. ......... 712/214 |
| 5,737,629 A * | 4/1998 | Zuraski et al. ............... 712/23 |
| 5,765,017 A * | 6/1998 | Hoy et al. .................... 712/23 |
| 5,765,035 A * | 6/1998 | Tran ........................... 712/216 |
| 5,826,055 A * | 10/1998 | Wang et al. ................ 712/218 |
| 5,867,683 A * | 2/1999 | Witt et al. ................... 712/218 |
| 5,870,580 A * | 2/1999 | Walker ........................ 712/218 |
| 5,887,185 A * | 3/1999 | Lynch .......................... 712/23 |
| 5,946,468 A * | 8/1999 | Witt et al. ................... 712/218 |
| 6,115,808 A * | 9/2000 | Arora ........................... 712/219 |
| 6,189,089 B1* | 2/2001 | Walker et al. ............... 712/218 |
| 6,438,681 B1* | 8/2002 | Arnold et al. ............... 712/216 |

OTHER PUBLICATIONS

Shen & Lipasti; Modern Processor Design: Fundamentals of Superscalar Processors; Jul. 2002; McGraw-Hill; Beta Edition; pp. 159-162, 175-177.*

* cited by examiner

*Primary Examiner*—Eddie Chan
*Assistant Examiner*—Corey S Faherty
(74) *Attorney, Agent, or Firm*—Lawrence J. Merkel; Meyertons, Hood, Kivlin, Kowert & Goetzel, P.C.

(57) ABSTRACT

In one embodiment, a renamer comprises a plurality of storage locations and compare circuitry. Each storage location is assigned to a respective renameable resource and is configured to store an identifier corresponding to a youngest instruction operation that writes the respective renameable resource. Coupled to receive an input representing one or more retiring instruction identifiers corresponding to instruction operations that are being retired, the compare circuitry is configured to detect a match between at least a first identifier in a first storage location and one of the retiring identifiers. An encoded form of the identifiers is logically divided into a plurality of fields, and the input comprises a first plurality of bit vectors. Each of the first plurality of bit vectors corresponds to a respective field and includes a bit position for each possible value of the respective field.

19 Claims, 10 Drawing Sheets

| SCH# | SID | | | SCH# | SID | | |
|---|---|---|---|---|---|---|---|
| | PD2 | PD1 | PD0 | | PD2 | PD1 | PD0 |
| 0 | 00 | 00 | 00 | 32 | 10 | 00 | 00 |
| 1 | 00 | 00 | 01 | 33 | 10 | 00 | 01 |
| 2 | 00 | 00 | 10 | 34 | 10 | 00 | 10 |
| 3 | 00 | 00 | 11 | 35 | 10 | 00 | 11 |
| 4 | 00 | 01 | 00 | 36 | 10 | 01 | 00 |
| 5 | 00 | 01 | 01 | 37 | 10 | 01 | 01 |
| 6 | 00 | 01 | 10 | 38 | 10 | 01 | 10 |
| 7 | 00 | 01 | 11 | 39 | 10 | 01 | 11 |
| 8 | 00 | 10 | 00 | 40 | 10 | 10 | 00 |
| 9 | 00 | 10 | 01 | 41 | 10 | 10 | 01 |
| 10 | 00 | 10 | 10 | 42 | 10 | 10 | 10 |
| 11 | 00 | 10 | 11 | 43 | 10 | 10 | 11 |
| 12 | 00 | 11 | 00 | 44 | 10 | 11 | 00 |
| 13 | 00 | 11 | 01 | 45 | 10 | 11 | 01 |
| 14 | 00 | 11 | 10 | 46 | 10 | 11 | 10 |
| 15 | 00 | 11 | 11 | 47 | 10 | 11 | 11 |
| 16 | 01 | 00 | 00 | 48 | 11 | 00 | 00 |
| 17 | 01 | 00 | 01 | 49 | 11 | 00 | 01 |
| 18 | 01 | 00 | 10 | 50 | 11 | 00 | 10 |
| 19 | 01 | 00 | 11 | 51 | 11 | 00 | 11 |
| 20 | 01 | 01 | 00 | 52 | 11 | 01 | 00 |
| 21 | 01 | 01 | 01 | 53 | 11 | 01 | 01 |
| 22 | 01 | 01 | 10 | 54 | 11 | 01 | 10 |
| 23 | 01 | 01 | 11 | 55 | 11 | 01 | 11 |
| 24 | 01 | 10 | 00 | 56 | 11 | 10 | 00 |
| 25 | 01 | 10 | 01 | 57 | 11 | 10 | 01 |
| 26 | 01 | 10 | 10 | 58 | 11 | 10 | 10 |
| 27 | 01 | 10 | 11 | 59 | 11 | 10 | 11 |
| 28 | 01 | 11 | 00 | 60 | 11 | 11 | 00 |
| 29 | 01 | 11 | 01 | 61 | 11 | 11 | 01 |
| 30 | 01 | 11 | 10 | 62 | 11 | 11 | 10 |
| 31 | 01 | 11 | 11 | 63 | 11 | 11 | 11 |

Fig. 5

| SCH# | PD2 | PD1 | PD0 |
|---|---|---|---|
| 0 | 0001 | 0001 | 0001 |
| 1 | 0001 | 0001 | 0010 |
| 2 | 0001 | 0001 | 0100 |
| 3 | 0001 | 0001 | 1000 |
| 4 | 0001 | 0010 | 0001 |
| 5 | 0001 | 0010 | 0010 |
| 6 | 0001 | 0010 | 0100 |
| 7 | 0001 | 0010 | 1000 |
| 8 | 0001 | 0100 | 0001 |
| 9 | 0001 | 0100 | 0010 |
| 10 | 0001 | 0100 | 0100 |
| 11 | 0001 | 0100 | 1000 |
| 12 | 0001 | 1000 | 0001 |
| 13 | 0001 | 1000 | 0010 |
| 14 | 0001 | 1000 | 0100 |
| 15 | 0001 | 1000 | 1000 |
| 16 | 0010 | 0001 | 0001 |
| 17 | 0010 | 0001 | 0010 |
| 18 | 0010 | 0001 | 0100 |
| 19 | 0010 | 0001 | 1000 |
| 20 | 0010 | 0010 | 0001 |
| 21 | 0010 | 0010 | 0010 |
| 22 | 0010 | 0010 | 0100 |
| 23 | 0010 | 0010 | 1000 |
| 24 | 0010 | 0100 | 0001 |
| 25 | 0010 | 0100 | 0010 |
| 26 | 0010 | 0100 | 0100 |
| 27 | 0010 | 0100 | 1000 |
| 28 | 0010 | 1000 | 0001 |
| 29 | 0010 | 1000 | 0010 |
| 30 | 0010 | 1000 | 0100 |
| 31 | 0010 | 1000 | 1000 |
| 32 | 0100 | 0001 | 0001 |
| 33 | 0100 | 0001 | 0010 |
| 34 | 0100 | 0001 | 0100 |
| 35 | 0100 | 0001 | 1000 |
| 36 | 0100 | 0010 | 0001 |
| 37 | 0100 | 0010 | 0010 |
| 38 | 0100 | 0010 | 0100 |
| 39 | 0100 | 0010 | 1000 |
| 40 | 0100 | 0100 | 0001 |
| 41 | 0100 | 0100 | 0010 |
| 42 | 0100 | 0100 | 0100 |
| 43 | 0100 | 0100 | 1000 |
| 44 | 0100 | 1000 | 0001 |
| 45 | 0100 | 1000 | 0010 |
| 46 | 0100 | 1000 | 0100 |
| 47 | 0100 | 1000 | 1000 |
| 48 | 1000 | 0001 | 0001 |
| 49 | 1000 | 0001 | 0010 |
| 50 | 1000 | 0001 | 0100 |
| 51 | 1000 | 0001 | 1000 |
| 52 | 1000 | 0010 | 0001 |
| 53 | 1000 | 0010 | 0010 |
| 54 | 1000 | 0010 | 0100 |
| 55 | 1000 | 0010 | 1000 |
| 56 | 1000 | 0100 | 0001 |
| 57 | 1000 | 0100 | 0010 |
| 58 | 1000 | 0100 | 0100 |
| 59 | 1000 | 0100 | 1000 |
| 60 | 1000 | 1000 | 0001 |
| 61 | 1000 | 1000 | 0010 |
| 62 | 1000 | 1000 | 0100 |
| 63 | 1000 | 1000 | 1000 |

Scheduler

| SCH# | R | V |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 1 |

D2[3:0]=0000,
D1[3:0]=0000,
Mask[3:0]=0000
→

Renamer

| AR# | SCH# PD2 | PD1 | PD0 | V |
|---|---|---|---|---|
| 0 | 00 | 00 | 00 | 0 |
| 1 | 00 | 10 | 01 | 1 |
| 2 | 00 | 00 | 11 | 0 |
| 3 | 00 | 01 | 00 | 1 |
| 4 | 00 | 10 | 00 | 0 |
| 5 | 11 | 10 | 01 | 0 |
| 6 | 00 | 00 | 01 | 0 |
| 7 | 11 | 10 | 10 | 0 |
| 8 | 00 | 01 | 11 | 1 |
| 9 | 00 | 11 | 11 | 0 |
| 10 | 00 | 00 | 10 | 0 |
| 11 | 11 | 10 | 11 | 0 |
| 12 | 00 | 01 | 10 | 0 |
| 13 | 00 | 11 | 10 | 0 |
| 14 | 00 | 11 | 01 | 0 |
| 15 | 00 | 01 | 01 | 0 |

Fig. 11

PARTIALLY DECODED REGISTER RENAMER

BACKGROUND

1. Field of the Invention

This invention is related to the field of processors and, more particularly, to resource renamers in processors.

2. Description of the Related Art

Processors form the heart of various computer systems, and are also rapidly becoming a key component in many other electronic systems. Processors execute instructions in a defined instruction set architecture, and a variety of software programs implementing the instruction set may be written to execute on the processors. Thus, processors offer flexibility in the system operation and usefulness.

Processors implement a variety of microarchitectural features in an attempt to increase the performance of instruction execution. Some processors permit out of order instruction execution, in which instructions that are ready to execute (e.g. all of their operands are ready) are permitted to execute even if older instructions are not yet ready to execute. Improvement in overall instruction execution rates may be achievable using out of order instruction execution.

One complication in out of order instruction execution is the write after read hazard. That is, if an older instruction reads a register (or other resource) and a younger instruction writes that same register, the older instruction must read the register before the younger instruction writes the register. Similarly, a write after write hazard exists if an older instruction and a younger instruction both write the same register. The older instruction's write must occur first.

Register renaming assigns temporary register locations to each register-writing instruction. If the instruction executes out of order with older instructions that read the same register, the instruction writes the temporary register and thus does not destroy the preceding value. As instructions are processed through the register renamer, the register addresses in the instructions are replaced with the current "rename" addresses identifying the temporary registers. Additionally, the renamer is updated with newly assigned renames for the instructions being processed. Accordingly, the renamer maintains a mapping of registers to renames.

Maintaining the rename mapping as instructions are retired (and their results committed) is a complicated process. Typically, an indication of the retired instruction must be compared to the renamer state to identify which, if any, rename mapping is invalidated (and the actual architected register is used instead). A content addressable memory (CAM) may be used for this purpose. If more than one instruction can be retired at the same time, additional CAM ports are required for each retiring instruction. Additionally, standard CAM memory comparisons typically consume significant power.

SUMMARY

In one embodiment, a processor comprises a scheduler that comprises a buffer configured to store a plurality of instruction operations to be issued for execution in the processor. Each of the plurality of instruction operations is identified by a corresponding identifier that locates the instruction in the buffer. The processor further comprises a mapper coupled to the scheduler. The mapper comprises a renamer configured to map each register to a respective identifier of a youngest instruction operation in the scheduler that writes the register. The renamer is coupled to receive an input from the scheduler representing one or more retiring instruction identifiers corresponding to instruction operations that are being retired from the scheduler. An encoded form of the identifiers is logically divided into a plurality of fields, and the input comprises a first plurality of bit vectors, each which corresponds to a respective field of the plurality of fields and includes a bit position for each possible value of the respective field. The renamer is configured to detect a match between a first identifier in the renamer and one of the retiring instruction identifiers, where detecting the match comprises detecting a set bit in the same bit position of one of the first plurality of bit vectors and a corresponding one of a second plurality of bit vectors, and wherein the second plurality of bit vectors correspond to the first identifier.

In another embodiment, a renamer comprises a plurality of storage locations and compare circuitry coupled to the storage locations. Each storage location is assigned to a respective renameable resource and is configured to store an identifier corresponding to a youngest instruction operation that writes the respective renameable resource. Coupled to receive an input representing one or more retiring instruction identifiers corresponding to instruction operations that are being retired, the compare circuitry is configured to detect a match between the identifiers in the plurality of storage locations and the one or more retiring instruction identifiers. An encoded form of the identifiers is logically divided into a plurality of fields, and the input comprises a first plurality of bit vectors. Each of the first plurality of bit vectors corresponds to a respective field and includes a bit position for each possible value of the respective field. The compare circuitry detects a match between a first identifier in a first storage location and one of the retiring instruction identifiers, including detecting a set bit in the same bit position of one of the first plurality of bit vectors and a corresponding one of a second plurality of bit vectors, wherein the second plurality of bit vectors correspond to the first identifier. A method is also contemplated.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

An example implementation will be described in more detail below for an embodiment of a processor that implements the PowerPC™ instruction set architecture. Other instruction set architectures may be implemented in other embodiments. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc.

Figure 1:
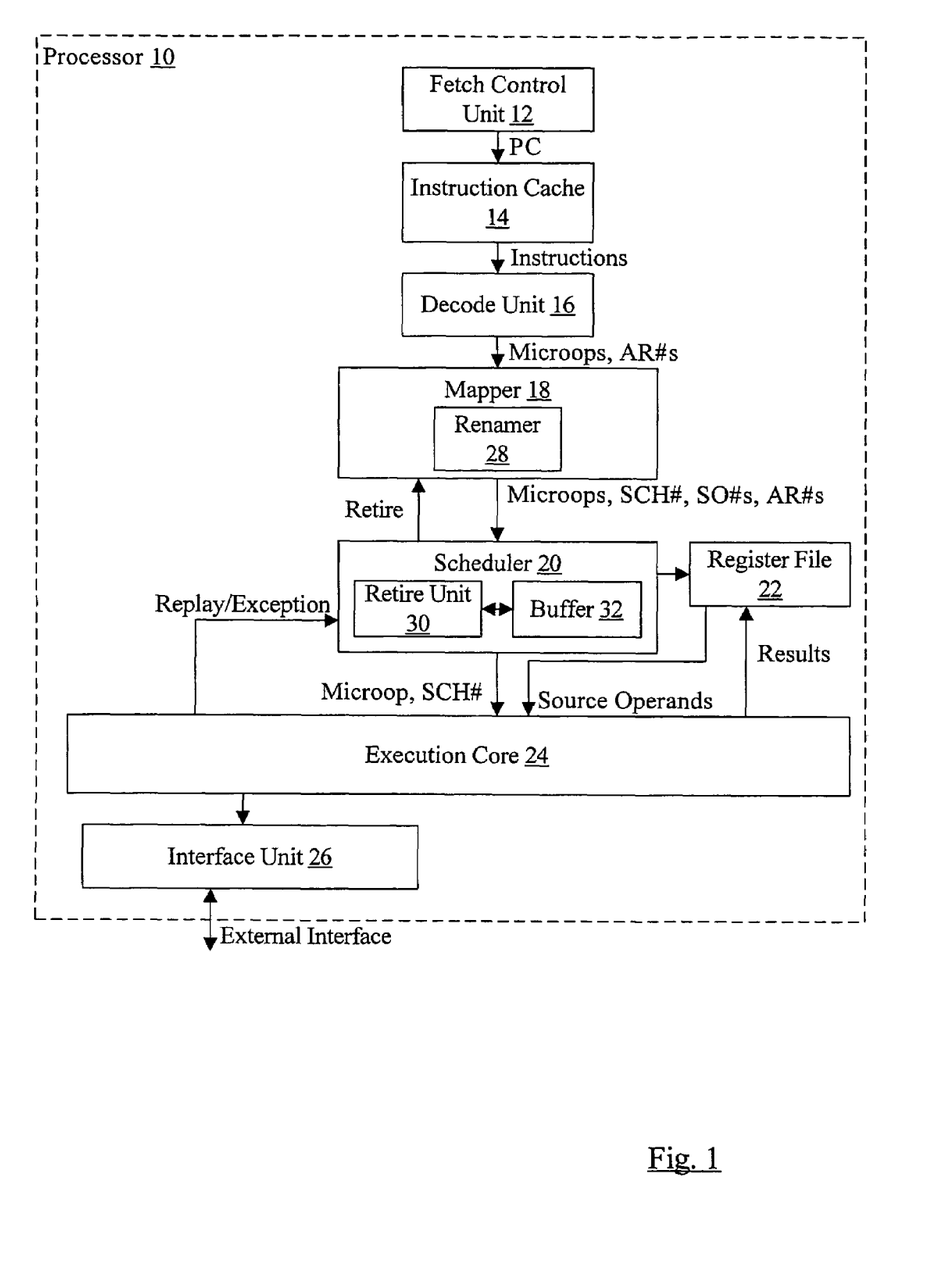
FIG. 1 is a block diagram of one embodiment of a processor.

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 26. The fetch control unit 12 is coupled to provide a program counter (PC) for fetching from the instruction cache 14. The instruction cache 14 is coupled to provide instructions to the decode unit 16, which is coupled to provide microops to the mapper 18 (including architected register numbers (AR#s) of registers used by the microops for either source operands or as a destination). The mapper 18 includes a renamer 28. The mapper 18 is coupled to provide microops, a scheduler number (SCH#), source operand numbers (SO#s), and AR#s to the scheduler 20. The scheduler 20 includes a retire unit 30 coupled to a buffer 32 in the illustrated embodiment. The scheduler 20 is coupled to receive replay/exception signals from the execution core 24, is coupled to the register file 22, and is coupled to provide microops for execution to the execution core 24 (and a SCH# for each microop). The register file 22 is coupled to provide operands to the execution core 24, and is coupled to receive results to be written to the register file 22 from the execution core 24. The scheduler 20 is further configured to provide a retire indication to the mapper 18 (more particularly, to the renamer 28). The execution core 24 is coupled to the interface unit 26, which is further coupled to an external interface of the processor 10.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations Generally, an instruction operation may be an operation that the hardware included in the execution core 24 is capable of executing. Each instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment. In some embodiments, there may be a one-to-one correspondence between instruction operations (microops) and instructions. That is, microops may simply be decoded instructions in such a case.

Microops generated by the decode unit 16 may be provided to the mapper 18. The mapper 18 may implement register renaming (e.g. in the renamer 28) to map source register addresses from the microops to the source operand numbers (SO#s) identifying the renamed source registers. Additionally, the mapper 18 may assign a scheduler entry to store each microop, identified by the SCH#. In one embodiment, the SCH# may also identify the rename register assigned to the destination of the microop. In other embodiments, the renamer 28 or mapper 18 may assign a separate destination register number.

The mapper 18 may provide the microops, along with SCH#, SO#s, and AR#s for each microop to the scheduler 20. The scheduler 20 may store the microops in the scheduler entries identified by the respective SCH#s, along with the SO#s and AR#s. More particularly, the buffer 32 may comprise the scheduler entries and may be written with the microops and related state. The buffer 32 may comprise any memory (e.g. one or more random access memory arrays, clocked storage devices such as flops, latches, registers, etc., or combinations of memory arrays and clocked storage devices).

The scheduler 20 may schedule the microops for execution in the execution core 24. When a microop is scheduled; the scheduler 20 may read its source operands from the register file 22 and the source operands may be provided to the execution core 24. Results of microops execution may be written to the register file 22 as well.

The scheduler 20 (and more particularly the retire unit 30) may be configured to retire microops as they become the oldest microops in the scheduler 20 and once any exception conditions are known from the execution of the microops. Retiring the microops may include committing the results to the "architected state" of the processor 10 (such that the results are not flushed if a subsequent exception occurs). At various points, microops may be referred to as being younger or older than other microops (or the youngest or oldest microop). Generally, a first microop may be younger than a second microop if the first microop is subsequent to the second microop according to the program order of the instructions being executed. A first microop may be older than a second microop if the first microop precedes the second microop according to the program order.

Additionally, retiring microops may include informing the mapper 18 of the freeing of the scheduler entries and further that the destination registers of the microops are committed to update the renamer 28. For example, in one embodiment, the register file 22 includes speculative registers used as destination rename registers and architected registers used to store committed state. In such an embodiment, the renamer 28 may include a valid bit indicating whether a speculative rename register for a given AR# is still valid. If not, the architected register contents may be used for the source operand. The renamer 28 may clear valid bits corresponding to destination registers of retiring microops in such an embodiment. Similarly, in an embodiment in which physical registers are implemented and the logical registers may be mapped to any physical registers at a given point in time, the renamer may record which physical registers are speculative and which are nonspeculative versions of a given logical register. In such an embodiment, the renamer may update nonspeculative state in response to retirement of microops. If an exception has occurred, the scheduler 20 may flush subsequent microops (and may flush the renamer 28 as well).

In some cases, a microop may be replayed by the scheduler 20. Generally, replay may cause the scheduler 20 to reschedule (reissue) the microop for execution. Replay may be signalled if an event occurs during execution which does not require an exception but does require reexecution to obtain a correct result. For example, if a load is executed out of order with respect to a previous store but accesses one or more bytes updated by the store, the load may be replayed in response to execution of the previous store. The scheduler 20 receives the replay signal, and may update its state to cause the replayed operation to be rescheduled at a later time. The scheduler 20 may also reschedule any subsequent microops, or subsequent microops that are dependent on the microop that is replayed.

The register file 22 may generally comprise any set of registers usable to store operands and results of microops executed in the processor 10. In some embodiments, the register file 22 may comprise a set of physical registers and the mapper 18 (renamer 28) may map the logical registers to the physical registers. The logical registers may include both architected registers specified by the instruction set architecture implemented by the processor 10 and temporary registers that may be used as destinations of microops for temporary results (and sources of subsequent microops as well). Generally, the logical registers are identified by AR#s. In other embodiments, the register file 22 may comprise an architected register set containing the committed state of the logical registers and a speculative register set containing speculative register state.

The interface unit 26 may generally include the circuitry for interface the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

The execution core 24 may include any combination of one or more execution units for executing microops. For example, one or more address generation units, translation units, load/store units, and/or data caches may be provided for processing load/store operations. Other units may be provided as well (e.g. one or more integer units, one or more floating point units, one or more graphics units, one or more cryptographic units, etc.). Generally, the execution core 24 may include any circuitry for executing instructions (or microops, in the illustrated embodiment).

It is noted that, while the illustrated embodiment uses a scheduler, other embodiments may implement other microarchitectures. For example, a reservation station/reorder buffer microarchitecture may be used. The reorder buffer may include a retire unit similar to the retire unit 30. If in-order execution is implemented, other microarchitectures without out of order execution hardware may be used.

Renamer

In the example described in more detail below, the renamer 28 is a register renamer that renames architected register numbers identifying logical registers. Generally, any processor resource that may be specified by an instruction may be renamed. A resource may comprise any state that is accessible via instruction execution (e.g. registers, storage locations such as memory locations, etc.). Thus, in general, the renamer 28 may be a resource renamer. The discussion below of the register renamer may be implemented in renamers for any renameable resource.

Figure 2:
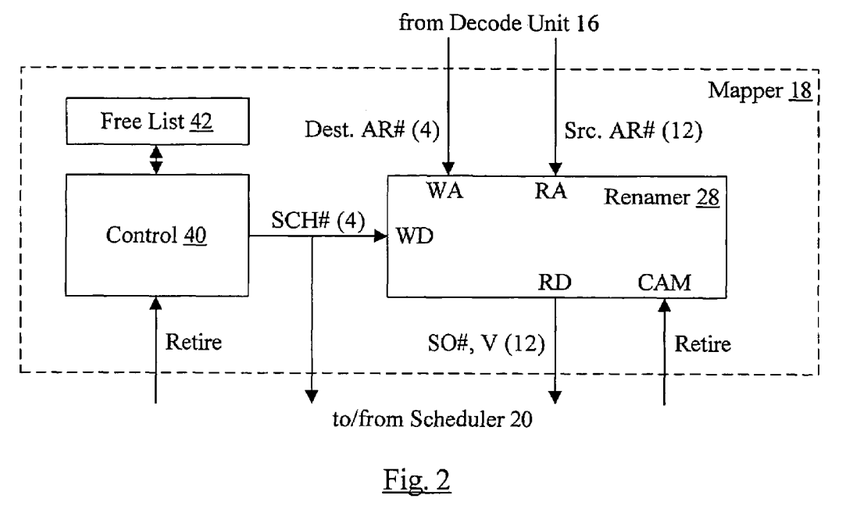
FIG. 2 is a block diagram of one embodiment of a mapper shown in FIG. 1.

Turning now to FIG. 2, a block diagram of one embodiment of a portion of the mapper 18 is shown. In the illustrated embodiment, the mapper 18 includes the renamer 28, a control unit 40, and a free list 42. The control unit 40 is coupled to the free list 42 and to the renamer 28. The control unit 40 is further coupled to receive a retire indication from the scheduler 20, and to supply at least one SCH# to the scheduler 20. The renamer 28 is further coupled to receive source (Src) and destination (Dest) AR#s from the decode unit 16 and to provide SO#s to the scheduler 20. The renamer 28 is further coupled to receive a retire input from the scheduler 20.

More particularly, the renamer 28 may comprise a memory of any sort (e.g. random access memory arrays, clocked storage devices, or any combination thereof). The renamer 28 may include one or more write ports (including write address (WA) and write data (WD) inputs), one or more read ports (including read address (RA) inputs and read data (RD) outputs), and a content address memory (CAM) port. The destination AR#s for each microop from the decode unit 16 may comprise the write addresses on the write ports and the SCH#s assigned to the corresponding microops may comprise the write data. In the illustrated embodiment, there are 4 write ports corresponding to up to 4 microops that may be concurrently received from the decode unit 16. Other embodiments may implement more or fewer concurrently decoded microops and more or fewer write ports. The source AR#s for each microop may comprise the read addresses on the read ports and the corresponding SO#s, with valid bit, may comprise the read data outputs. In the illustrated embodiment, up to 12 source AR#s may be received (up to 3 for each of the 4 microops). The retire input is provided to the CAM port for updating the state of the renamer 28 when one or more microops are retired.

The renamer memory is indexed by AR# (destination for write, source for read). That is, the renamer memory comprises multiple storage locations, each storage location assigned to a respective AR#, and thus to a respective logical register. In general, the memory may include a storage location assigned to each renameable resource. The storage locations store an identifier corresponding to the youngest microop that has the logical register as a destination (i.e. the youngest microop that writes the logical register). For example, in the present embodiment, the identifier is the SCH# assigned to the microop. Other embodiments may use any value that uniquely identifies the microops in flight in the processor 10. For example, in embodiments which identify the destination rename register separate from the SCH#, the destination rename register number may be stored in the assigned storage location.

For the source operands of the decoded microops, the renamer 28 maps each source operand to the corresponding source operand number (SO#) by reading the identifier from the storage location assigned to the source AR#. That is, the identifier (the SCH#) may be the SO#. Additionally, the renamer 28 may include a valid bit, in the present embodiment, that indicates whether or not the microop that writes the register is still in the scheduler 20 (not yet retired). The valid bit may be output with the SO#. Accordingly, each source operand may have a corresponding SO# and an indication of whether to read the source operand from the rename register indicated by the SO# or the architected register. It is noted that there may be dependencies on older microops that are concurrently decoded with a given microop. Such dependencies may be detected by the renamer 28 or the control unit 40, and the SO# from the addressed storage location may be overridden with the SCH# from the older, concurrently decoded microop.

For destination AR#s, the renamer 28 may update the indexed storage locations with the corresponding SCH#s from the control unit 40, thus recording the youngest microops to update the corresponding logical registers. The valid bits in the indexed storage locations may also be set.

The retire input to the CAM port identifies one or more retiring microops. Compare circuitry in the renamer 28 receives the retire input, and detects a match between store SCH#s in the entries and the SCH#s of the retiring microops, as indicated by the retire input. Zero or more matches may be detected for a given retire input, and more than one match may be detected (up to the maximum number of concurrently retireable microops). For each match, the renamer 28 may clear the valid bit in the storage location. Additional details regarding the retire input to the CAM port and the operation of the renamer 28 in response are provided below with regard to FIG. 3.

The control unit 40 selects SCH#s from the free list 42, and manages the free list 42 responsive to the retiring of microops by the scheduler 20. The scheduler 20 may indicate which microops are being retired (according to the SCH#s assigned to the microops), and the control unit 40 may add the indicated SCH#s to the free list 42. The free list 42 may be managed in any desired fashion. For example, the free list 42 may be implemented as a head and tail pointer, indicating which scheduler entries are currently storing the youngest and oldest microops. The head pointer may be updated in response to the retire indication, and the tail pointer may be updated as decoded instructions are transmitted to the scheduler 20. Alternatively, the free list 42 may be implemented as a bit vector with a bit position for each scheduler entry. The bit may be set to indicate that the entry is free, and clear to indicate that the entry is occupied by a microop (or vice versa). The control unit 40 may select SCH#s from the free list 42 and assign them to microops received from the decode unit 16 (by providing the SCH#s on the write data ports). The SCH#(s) may be provided to the scheduler 20 as well to write the microops into the assigned scheduler entries. In one embodiment, since consecutive entries in the scheduler are assigned to concurrently decoded microops, only the SCH# corresponding to the initial microop in the concurrently decoded group is transmitted to the scheduler 20. The scheduler 20 may write the received microops into the consecutive entries beginning with the entry indicated by the SCH#.

The retire indication provided to the control unit 40 from the scheduler 20 may be the same retire indication provided to the renamer 28, or may convey the same information in a manner more convenient to the control unit 40, as desired. Generally, the SCH#s of microops being retired by the scheduler 20 may be indicated to the control unit 40 in some fashion.

Figure 3:
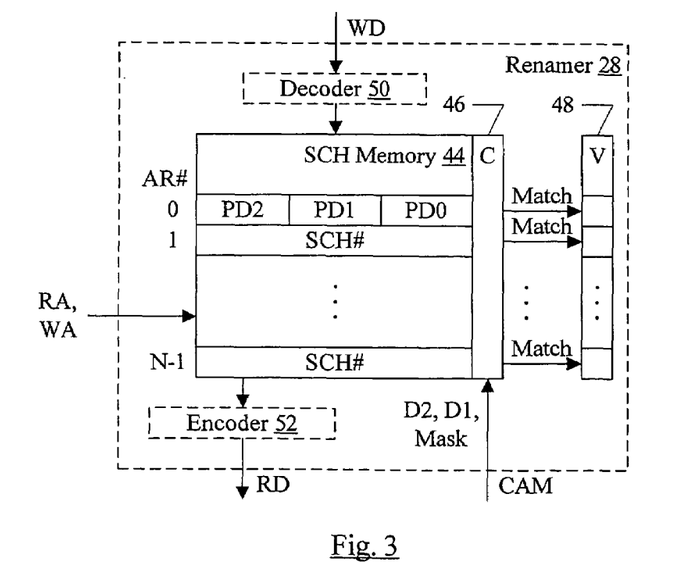
FIG. 3 is a block diagram of one embodiment of a renamer shown in FIG. 2

Turning now to FIG. 3, a block diagram of one embodiment of the renamer 28 is shown in greater detail. In the illustrated embodiment, the renamer 28 includes an SCH memory 44, comparator circuitry 46, and a valid bit memory 48. In some embodiments, the renamer 28 may also include a decoder 50 and an encoder 52, as described in more detail below. The SCH memory 44 (or the decoder 50) is coupled to the WD port to receive SCH#s to be written to the SCH memory 44. The SCH memory 44 (or the encoder 52) is coupled to the RD port to output read data. The RA and WA ports index into the SCH memory 44/valid bit memory 48, which has storage locations assigned to each AR#. Thus, there are N AR#s 0 to N−1 in the illustrated embodiment, and there are N storage locations in the SCH memory 44 and valid bit memory 48. Each storage location is configured to store a SCH# and valid bit, as illustrated in FIG. 3. The compare circuitry 46 is coupled to the SCH memory 44 and to the CAM port of the renamer 28. Additionally, the compare circuitry is configured to generate match signals for each storage location to the valid bit memory 48.

The storage location for AR# 0 illustrates the logical division of the stored SCH#s in the SCH memory 44 for comparison to the CAM input, for one embodiment. Generally, the stored SCH#s may logically be divided into two or more fields, and the retire input may include a bit vector for each field. The bit vector for a given field may include a bit position for each possible value of the field. The bit in a given bit position may indicate whether or not a match is to be detected for the corresponding value in the given field. For example, if the bit is set, a match is to be detected if the given field has the corresponding value. If the bit is clear, a match is not to be detected. Other embodiments may assign the opposite means to the set and clear states of the bit. Accordingly, based on the SCH#s of the microops being retired, the retire unit 30 may generate the bit vectors for the fields.

The compare circuitry 46 may decode the fields of the stored SCH#s into corresponding one hot bit vectors for comparison. A match may be detected if at least one bit in each bit vector from a stored SCH# is set and the corresponding bit in the same bit position of the same bit vector on the CAM input is also set. Thus, zero or more matches may be detected by the compare circuitry 46. For each SCH memory 44 storage location for which a match is detected, the compare circuitry 46 may assert a match signal to the valid bit memory 48. Responsive to the assertion of the match signal corresponding to a given storage location, the valid bit memory 48 may clear the stored bit in that given storage location.

In one embodiment, the size of the field including the least significant bit of the SCH# (the "least significant field") may determine groupings of SCH#s (and thus groupings of scheduler entries) that may be retired concurrently. The input bit vectors corresponding to the remaining fields may be one hot bit vectors that specify the values of the SCH#s of the microops that are being retired. That is, the SCH#s of the concurrently retiring microops are equal in the fields other than the least significant field. The bit vector of the retire input that corresponds to the least significant field may be used as a mask to specify which scheduler entries are being retired within the group indicated by the other input (one hot) bit vectors. For example, in one implementation there are 64 scheduler entries, and thus the encoded form of the SCH# is 6 bits (since $2^6$=64). In the implementation, three fields of two bits each may be defined. Since the least significant field is two bits, the scheduler entries are grouped in groups of 4 (on mod 4 boundaries of the scheduler numbers) for concurrent retirement.

In the illustrated embodiment, three fields PD2, PD1, and PD0 are defined. For a scheduler having 64 scheduler entries, each field may be 2 bits. The retire input thus has three bit vectors D2 (corresponding to PD2), D1 (corresponding to PD1) and Mask (corresponding to PD0, the least significant field). D2 and D1 may be generated as one hot bit vectors. For example, each of D2 and D1 may be 4 bits. Bit 0 of D2 may be set if the PD2 field of the retiring SCH# is 00 (in binary); bit 1 of D2 may be set if the PD2 field of the retiring SCH# is 01 (in binary); bit 2 of D2 may be set if the PD2 field of the retiring SCH# is 10 (in binary); and bit 3 may be set if the PD2 field of the retiring SCH# is 11 (in binary). The bits of D1 may similarly be set based on the PD1 field of the SCH#. Bits in the mask may be set based on whether the microop having the corresponding SCH# within the group defined by the D2 and D1 vectors is being retired. That is, bit 0 may be set if the SCH# having least significant bits 00 (in binary) is being retired; bit 1 may be set if the SCH# having least significant bits 01 (in binary) is being retired; bit 2 may be set if the SCH# having least significant bits 10 (in binary) is being retired; and bit 3 may be set if the SCH# having least significant bits 11 (in binary) is being retired. Any combination of bits in the mask may be set. Generally, bits corresponding to consecutively numbered scheduler entries (consecutive SCH#s) may be set if more than one bit is set, in embodiments that retire microops in program order.

Accordingly, multiple microops may be retired and the renamer 28 may be updated from one CAM port, in the illustrated embodiment. Reducing the number of CAM ports may reduce the power consumption of the renamer 28, in some embodiments. Furthermore, in some embodiments, the comparison circuitry 46 may be implemented in static logic circuitry. Further reduction in power consumption may be achieved.

In one embodiment, the SCH memory 44 may store the encoded form of the SCH# in each entry. The comparator circuitry 46 may decode the fields of the SCH# for comparison to the input bit vectors. In other embodiments, the SCH memory 44 may store the SCH# in partially decoded form according to the field definitions used for the CAM input. In such an embodiment, the decoder circuit 50 and the encoder circuit 52 may be used. When SCH#s are received, the decoder circuit 50 may decode each field of the SCH# into a one hot bit vector and store the bit vectors in the storage locations addressed by the WA ports. The comparator circuit 46 may compare the decoded fields to the corresponding bit vectors on the CAM input. When storage locations are read via the RA inputs, the encoder circuit 52 may encode the stored fields to produce the encoded form of the SCH# for transmission to the scheduler 20. As used herein, the "encoded form" of the SCH# may refer to the form which uses the fewest bits to represent the possible values of the SCH#. Generally, the encoded form of the SCH# that has $2^N$ possible values may be represented in encoded form with N bits. If the possible values of the SCH# is not a power of two, the next largest power of two may be used.

It is noted that, while one implementation may use three fields of two bits each, any number of two or more fields may be used in other embodiments. The fields implemented in a given embodiment need not all be of the same size, and any size of the fields may be implemented in various embodiments.

In the above discussion, the retire input included a mask for the least significant field and one hot bit vectors for the other fields. However, other embodiments may use a mask for any field to detect more than one match for the value of that field. For example, a flush may be implemented by setting all bits in all bit vectors. Such an input matches each SCH# in the SCH memory 44, and clears the valid bits in the valid bit memory 48.

It is noted that, while one CAM port is implemented in the illustrated embodiments, other embodiments may implement more than one CAM port. Each CAM port may have inputs similar to the above description. For example, if two CAM ports were implemented, microops from two different groups may be retired concurrently. Such an implementation may widen the retirement window from one group to two groups. For example, microops from any two consecutive groups could be retired concurrently. Any number of CAM ports may be implemented in various embodiments, and multiple SCH# entries may be retireable on each CAM port.

It is noted that a storage location in the illustrated embodiment of the renamer may comprise a storage location in the SCH memory 44 and a corresponding bit location in the valid bit memory 46.

Figure 4:
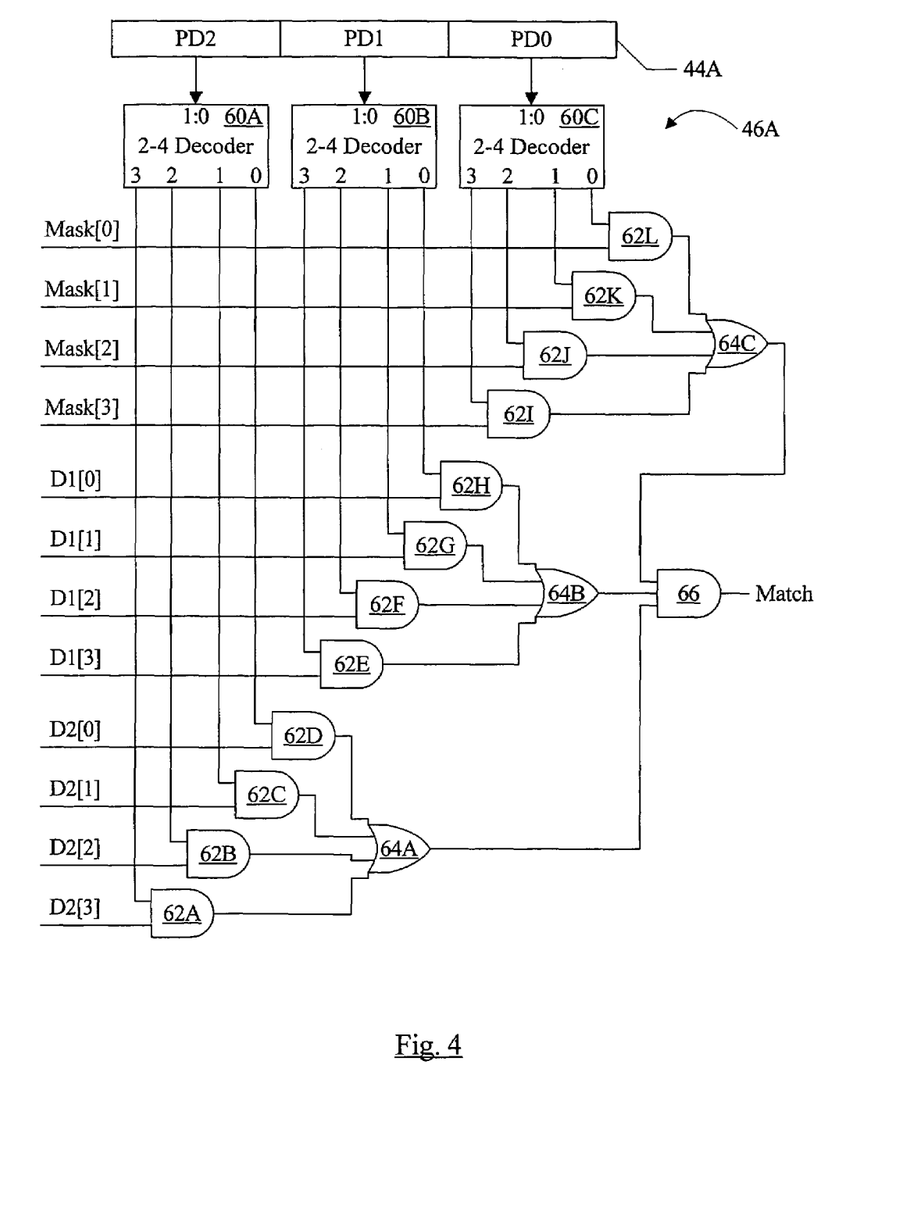
FIG. 4 is a circuit diagram of one embodiment of a renamer entry and corresponding compare circuitry.

Turning now to FIG. 4, a circuit diagram of one embodiment of one storage location 44A of the SCH memory 44 and one embodiment of corresponding compare circuitry 46A is shown. Similar compare circuitry may be implemented for each other storage location of the SCH memory 44. In the illustrated embodiment, the circuitry 46A includes decoders 60A-60C coupled to receive the bits from each of the respective fields PD2, PD1, and PD0 of the storage location 44A. The circuitry 46A further comprises AND gates 62A-62L, and the decoder outputs are coupled as inputs to respective AND gates (e.g. the decoder 60A outputs are coupled to AND gates 62A-62D; the decoder 60B outputs are coupled to AND gates 62E-62H; and the decoder 60C outputs are coupled to AND gates 62I-62L). The outputs of AND gates 62A-62D are inputs to an OR gate 64A, and similarly the outputs of AND gates 62E-62H are inputs to an OR gate 64B and the outputs of AND gates 62I-62L are inputs to an OR gate 64C. The outputs of OR gates 64A-64C are inputs to an AND gate 66, the output of which is the match signal for the storage location 44A. The AND gates 62A-62D are coupled to receive respective inputs of the D2 field; the AND gates 62E-62H are coupled to receive the respective inputs of the D1 field, and the AND gates 62I-62L are coupled to receive the respective inputs of the Mask field.

Each of the decoders 60A-60C are 2-4 decoders in the illustrated embodiment, and thus may be used for an embodiment in which a 64 entry scheduler is used and the encoded SCH# is stored by the renamer. Other embodiments may implement different decoders depending on the size of the respective fields. Embodiments that store the decoded form of each field may not implement the decoders 60A-60C, and may use the contents of the storage location 44A directly as inputs to the AND gates 62A-62L.

In the illustrated embodiment, the decoders 60A-60C decode their respective fields into one hot vectors, illustrated by the output lines labeled 0 to 3. If the respective field PD2-PD0 is coded to 0 (binary 00), the corresponding decoder 60A-60C asserts the output line labeled 0 (and other outputs are deasserted). Similarly, if the respective field PD2-PD0 is coded to 1 (binary 01), the corresponding decoder 60A-60C asserts the output line labeled 1 (and other outputs are deasserted); if the respective field PD2-PD0 is coded to 2 (binary 10), the corresponding decoder 60A-60C asserts the output line labeled 2 (and other outputs are deasserted); and if the respective field PD2-PD0 is coded to 3 (binary 11), the corresponding decoder 60A-60C asserts the output line labeled 3 (and other outputs are deasserted).

The AND gates 62A-62D detect if the value of the field PD2 matches a corresponding value being searched for on the CAM input. If the D2 vector is one hot, either the PD2 field matches the corresponding field being searched for or not by the one hot vectors having their set bit in the same bit position. If the D2 vector is not one hot, the PD2 field may match any of the values being searched for: the one hot vector from the decoder 60A may have its set bit in any bit position for which the D2 input vector has a set bit. The AND gates 62A-62D logically AND the respective bit positions of the D2 input vector and the vector from the decoder 60A, and the OR gate 64A logically ORs the result. Similar operation by the AND gates 62E-62H and OR gate 64B for the D1 vector and the output of the decoder 60B indicates whether or not a match of the D1 vector and the PD1 field is detected, and similar operation by the AND gates 62I-62L and OR gate 64C for the Mask and the output of the decoder 60C indicates whether or not a match of the Mask and the PD0 field is detected. Thus, an overall match of the storage location 44A is detected by logically ANDing the outputs of the OR gates 64A-64C in the AND gate 66 to generate the match signal.

Each AND-OR structure in FIG. 4 (e.g. the AND gates 62A-62D and the OR gate 64A) represents one field in the identifiers used for register renaming. Accordingly, the AND-OR structure may vary as the size of the fields vary. For example, a 3 bit field may involve 8 AND gates (one for each bit position in an 8 bit vector to represent the $2^3$ possible values of the 3 bit field) and an OR gate.

While individual AND gates and an OR gate are shown in FIG. 4, in some embodiments, the AND gates and OR gate may be implemented as a single circuit structure. For example, static AND-OR complementary metal-oxide-semiconductor (CMOS) gates are often available in circuit libraries used to build static logic circuits. Furthermore, while specific logic gates are shown in FIG. 4, any circuit structure may be used, including any Boolean equivalents of the circuit shown. Any logic gate may be implemented as any Boolean equivalent, including a hierarchy of gates to accomplish the same logical function.

As mentioned previously, in some embodiments, the compare circuitry 46A may be implemented in static logic circuitry. Static logic circuitry may consume less power than dynamic logic circuitry, typically.

Figure 5:
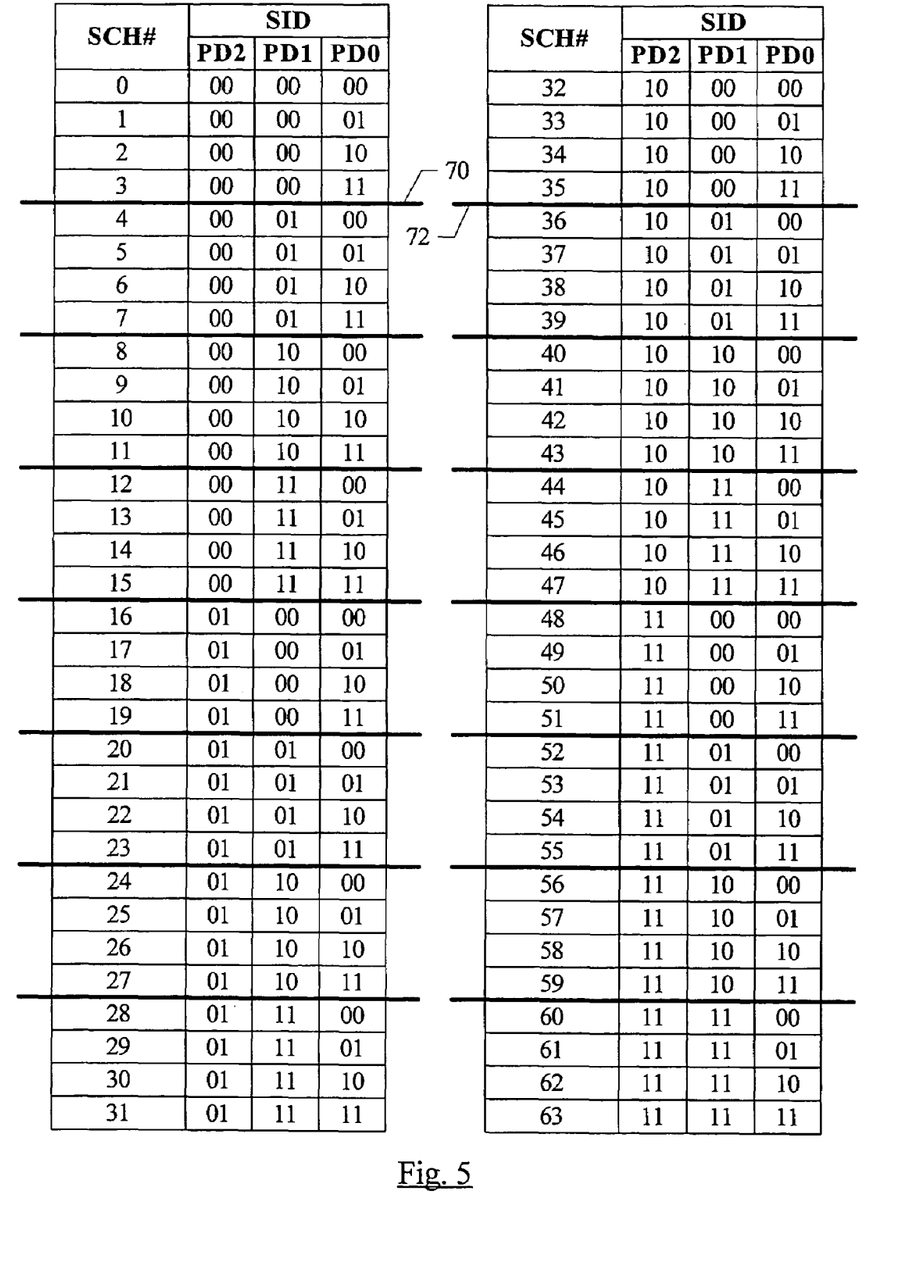
FIG. 5 is a truth table for one embodiment, illustrating scheduler numbers and corresponding bit fields in the renamer.

Turning next to FIG. 5, a truth table is shown for one embodiment of the processor 10 in which 64 scheduler entries are implemented and the SCH# is stored in the renamer 28 in encoded form. The values of the PD2, PD1, and PD0 fields are shown for each value of the SCH# (from 0 to 63). In the table of FIG. 5, the SCH# values are listed in decimal and the PD2, PD1, and PD0 columns are in binary. Thus, each field PD2, PD1, and PD0 is two bits in this embodiment.

Heavy dark lines (e.g. reference numerals 70 and 72) in FIG. 5 illustrate the groups of SCH#s, delimited by changes in either the PD2 or PD1 fields. That is, the groups of SCH#s that can be retired concurrently with one input on the CAM port of the renamer 28 for this embodiment (using D2 and D1 as one hot vectors) are delimited by the lines (and the bottom of the columns in FIG. 5 is also a delimiter). Accordingly, SCH#s 0-3 (or any subset thereof) may be retired concurrently, as may SCH#s 4-7 (or any subset), etc.

Figure 6:
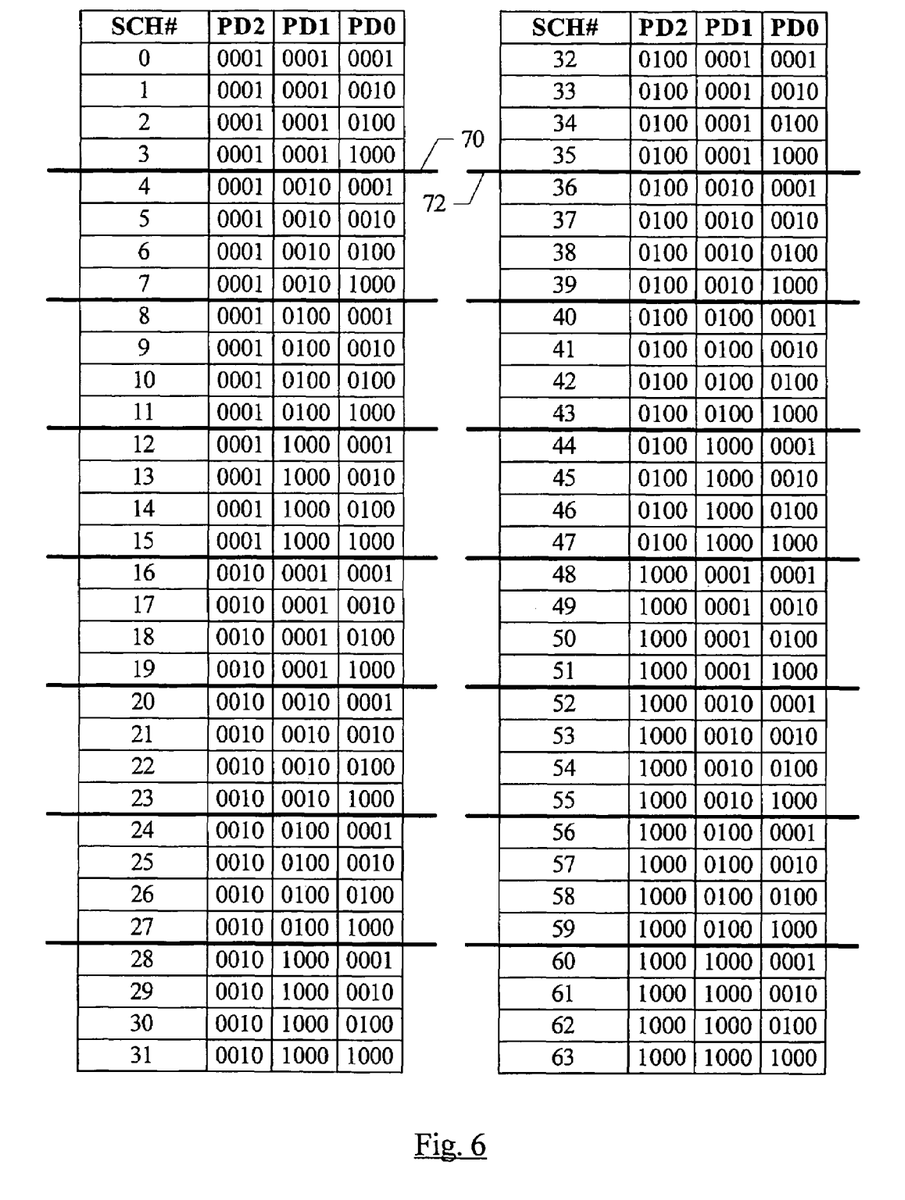
FIG. 6 is a truth table for another embodiment, illustrating scheduler numbers and corresponding bit fields in the renamer.

FIG. 6 is a truth table illustrating another embodiment for 64 scheduler entries, where the renamer 28 stores the PD2, PD1, and PD0 fields in decoded form. Accordingly, four bits are shown per column, in one hot form. The least significant bit is shown to the right in each column. The PD2 and PD1 columns are also illustrative of the D2 and D1 inputs that would be used for a corresponding SCH# (or group, where the heavy dark lines such as reference numerals 70 and 72 again illustrate the delineation between groups).

Figure 7:
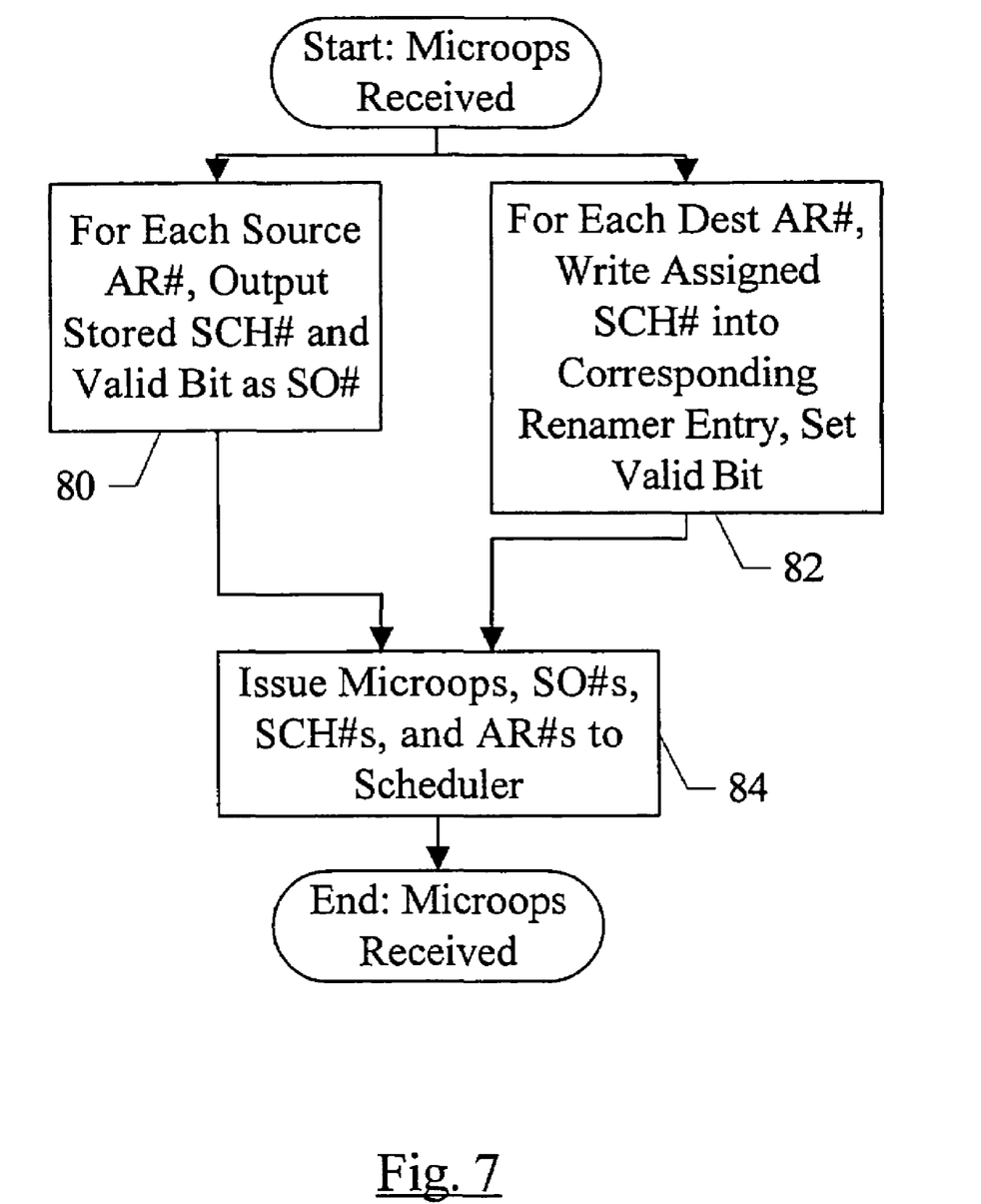
FIG. 7 is a flowchart illustrating operation of one embodiment of the renamer in response to receiving microops.

Turning now to FIG. 7, a flowchart is shown illustrating operation of one embodiment of the mapper 18 (including the renamer 28) in response to receiving one or more microops from the decode unit 16. While the blocks are shown in a particular order in FIG. 7 for ease of understanding, any order may be used. Furthermore, blocks may be performed in parallel even if not explicitly illustrated as so in FIG. 7, by combinatorial logic in the mapper 18 and/or renamer 28. Blocks, combinations of blocks, or the flowchart as a whole may be pipelined over multiple clock cycles.

For each provided source AR#, the renamer 28 may output the SCH# stored in the storage location indexed by that source AR#, along with the valid bit from the storage location, as the SO# for that source operand (block 80). Additionally, for each provided destination AR#, the renamer 28 may write the assigned SCH# provided by the control unit 40 to the storage location indexed by that destination AR#. Additionally, the valid bit may be set for the storage location (block 82). The mapper 18 may issue the microops, the SO#s, the SCH#s, and the AR#s to the scheduler 20 to be written to the assigned scheduler entries (block 84). Additionally, the control unit 40 may update the free list 42 to reflect consumption of the scheduler entries.

Figure 8:
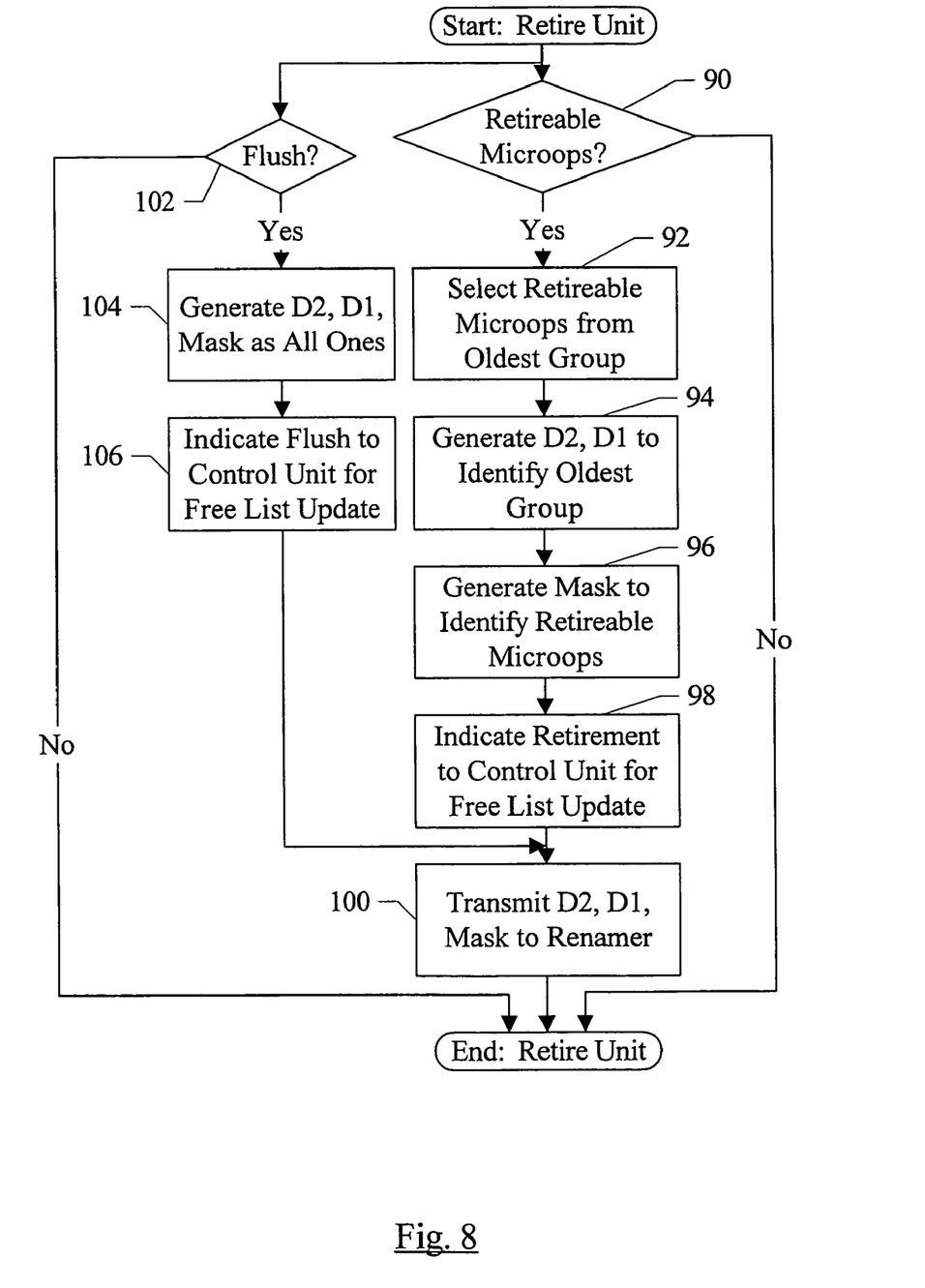
FIG. 8 is a flowchart illustrating operation of one embodiment of a retire unit in the scheduler.

Turning now to FIG. 8, a flowchart is shown illustrating operation of one embodiment of the retire unit 30 for interfacing with the renamer 28. While the blocks are shown in a particular order in FIG. 8 for ease of understanding, any order may be used. Furthermore, blocks may be performed in parallel even if not explicitly illustrated as so in FIG. 8, by combinatorial logic in the retire unit 30. Blocks, combinations of blocks, or the flowchart as a whole may be pipelined over multiple clock cycles.

The retire unit 30 may generate a retire input for the renamer 28 (on its CAM port) in response to retiring one or more microops (decision block 90 and related blocks) and to perform a flush (decision block 102 and related blocks). If the retire unit 30 detects that the buffer 32 has one or more microops ready to retire (decision block 90, "yes" leg), the retire unit 30 may select the retireable microops from the oldest group in the scheduler 20 (block 92). The group is defined by the size of the least significant field of the SCH# supported by the renamer 28 for its CAM port, as described above. The oldest group may be the group that includes the oldest microop in the scheduler 20. The retire unit 30 may generate the D2 and D1 vectors to identify the oldest group, using the corresponding fields of the SCH#s of the entries in the oldest group (block 94). The retire unit 30 may also generate the Mask to identify the retireable microops in the group (block 96). Furthermore, the retire unit 30 may indicate the retirement to the control unit 40 so that the control unit 40 may update the free list 42 to reflect the retirement (block 98). The retire unit 30 may transmit the D2, D1, and Mask vectors to the renamer 28 (on the CAM port) (block 100).

If the retire unit 30 is to perform a flush (e.g. retiring a microop that has an exception) (decision block 102, "yes" leg), the retire unit 30 may generate the D2, D1, and Mask vectors as all ones (block 104) and may indicate a flush to the control unit 40 to update the free list 42 (block 106). The retire unit 30 may transmit the D2, D1, and Mask vectors to the renamer 28 (on the CAM port) (block 100).

Figure 9:
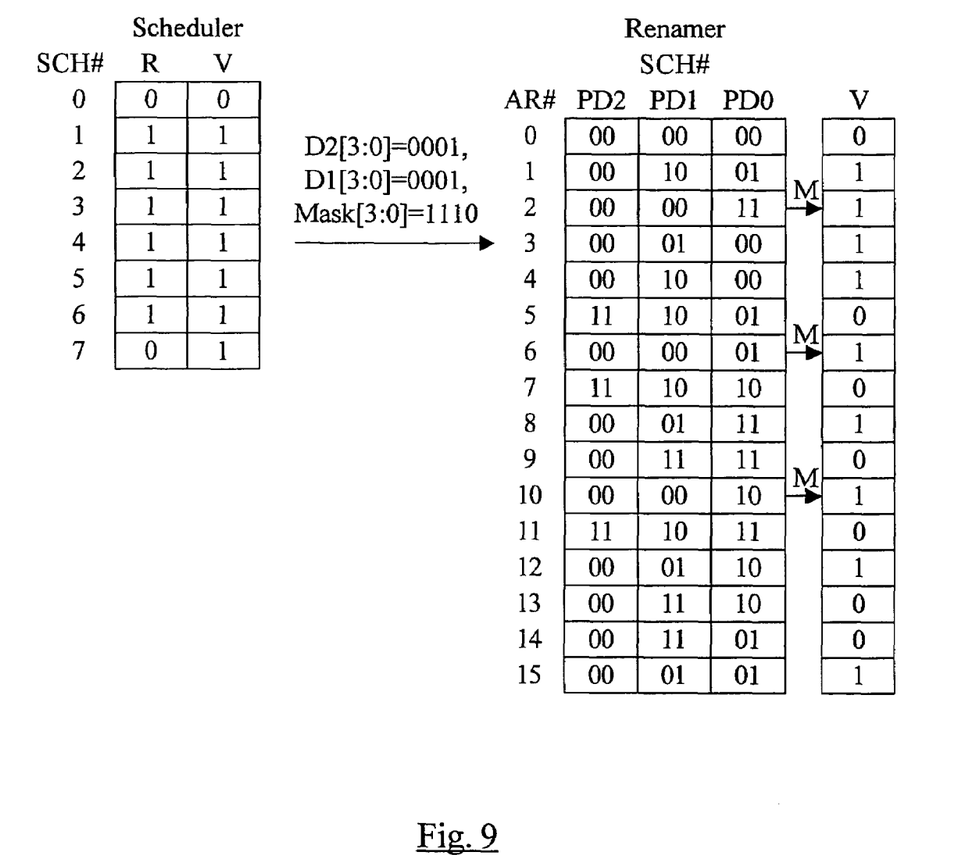
FIGS. 9-11 illustrate an example of operation of one embodiment of the renamer and scheduler.
Figure 10:
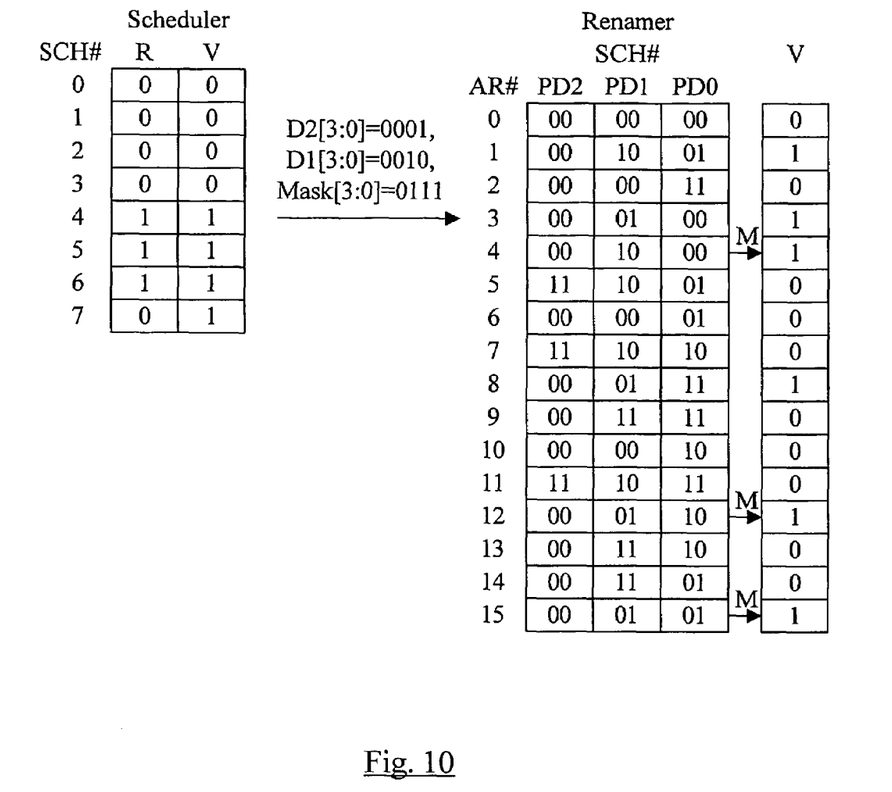
Figure 11:
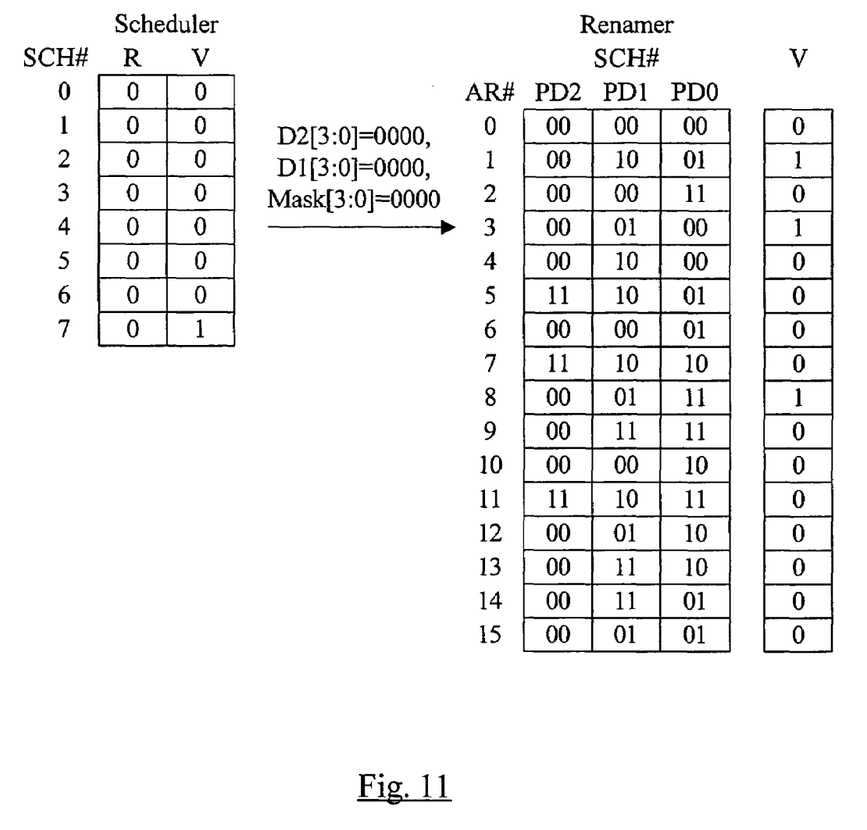

Turning next to FIGS. 9-11, an example of the retirement of microops from the scheduler 20 and the update of the renamer 28 is shown for an embodiment having 64 scheduler entries and that stores SCH#s in the renamer 28 in encoded form. The example uses three fields in the SCH# of two bits each. Scheduler entries 0 to 7 are represented in the example, with a valid bit (V) and a retire bit (R) for each entry. Renamer storage locations corresponding to AR#s 0 to 15 are shown as well, with the SCH# divided into the three fields and the valid bit. Match signal assertions are illustrated by arrows with an "M" over them.

In FIG. 9, the scheduler 20 has valid microops in entries 1 through 7. The microops in entries 1 through 6 are ready to retire (they have retire bits set). Accordingly, the retire unit 30 selects the microops in the oldest group (the group corresponding to SCH#s 0 to 3 in this example) and generates the D2, D1, and Mask vectors as shown in FIG. 9. Since the PD2 and PD1 fields of the SCH#s in the oldest group are both 00, the retire unit 30 generates the D2 and D1 vectors with bit 0 set. Additionally, the mask has bits 3, 2, and 1 set for SCH#s 3, 2, and 1 being ready to retire, respectively.

SCH#1 matches AR#6; SCH#2 matches AR#10; and SCH#3 matches AR#2. Accordingly, the valid bits for each of AR#s 2, 6, and 10 are cleared. In FIG. 10, the cleared valid bits for AR#s 2, 6, and 10 are shown. Additionally, in FIG. 10, scheduler entries 1, 2, and 3 are invalidated since they have been retired.

The retire unit 30 detects that the microops in entries 4, 5, and 6 are ready to retire and are in the oldest group since the microops 1, 2, and 3 have been retired. The microop in entry 7 is valid, but not yet ready to retire (as illustrated by the clear R bit in FIG. 10). The retire unit 30 generates the D2 vector with bit 0 set and the D1 vector with bit 1 set (since PD2 for the group of SCH#s 4-7 is 00 and PD1 is 01). The retire unit 30 generates the Mask with bits 2, 1, and 0 set for SCH#s 6, 5, and 4, respectively.

SCH#4 matches AR#4; SCH#5 matches AR#15; and SCH#6 matches AR#12. Accordingly, the valid bits for each of AR#s 4, 12, and 15 are cleared. In FIG. 11, the cleared valid bits for AR#s 4, 12, and 15 are shown. Additionally, in FIG. 11, scheduler entries 4, 5, and 6 are invalidated since they have been retired. Scheduler entry 7 remains valid.

Numerous variations and modifications will become apparent to those skilled in the art once the above disclosure is fully appreciated. It is intended that the following claims be interpreted to embrace all such variations and modifications.

What is claimed is:

1. A renamer comprising:

a plurality of storage locations, each of the plurality of storage locations assigned to a respective renameable resource and configured to store an identifier corresponding to a youngest instruction operation that writes the respective renameable resource; and compare circuitry coupled to the plurality of storage locations and coupled to receive an input representing one or more retiring instruction identifiers corresponding to instruction operations that are committing their results to architected state, wherein the compare circuitry is configured to detect a match between the identifiers in the plurality of storage locations and the one or more retiring instruction identifiers;

wherein an encoded form of the identifiers is logically divided into a plurality of fields, and wherein the input comprises a first plurality of bit vectors, wherein each of the first plurality of bit vectors corresponds to a respective field of the plurality of fields and includes a bit position for each possible value of the respective field, and wherein the compare circuitry detecting a match between a first identifier in a first storage location of the plurality of storage locations and one of the retiring instruction identifiers comprises detecting a set bit in the same bit position of one of the first plurality of bit vectors and a corresponding one of a second plurality of bit vectors, wherein the second plurality of bit vectors correspond to the first identifier, and wherein a first bit vector of the first plurality of bit vectors comprises a mask having set bits for each of the retiring instruction identifiers, and wherein each retiring instruction identifier corresponds to a different instruction operation that is committing its result to architected state.

2. The renamer as recited in claim 1 wherein a second bit vector of the first plurality of bit vectors is a one hot vector.

3. The renamer as recited in claim 2 wherein each of the second plurality of bit vectors are one hot vectors.

4. The renamer as recited in claim 1 wherein the identifiers locate instruction operations in a buffer.

5. The renamer as recited in claim 4 wherein the buffer is included in a scheduler that schedules instruction operations for execution.

6. The renamer as recited in claim 1 wherein the one or more retiring instruction identifiers comprise at least two retiring instruction identifiers that are consecutively numbered.

7. The renamer as recited in claim 6 wherein a second bit vector of the first plurality of bit vectors identifies a group within the identifier values, and wherein the mask identifies the retiring instruction identifiers within the group.

8. The renamer as recited in claim 1 wherein each of the plurality of storage locations stores the encoded form of the identifier.

9. The renamer as recited in claim 1 wherein each of the plurality of storage locations stores the identifier decoded into the second plurality of bit vectors.

10. The renamer as recited in claim 1 wherein a flush of the renamer is performed by providing the first plurality of bit vectors with each bit in the first plurality of bit vectors set.

11. The renamer as recited in claim 1 wherein each of the plurality of storage locations is further configured to store a valid bit indicative of whether or not the identifier in the storage location is valid, and wherein the valid bit is set to invalid in response to the compare circuit detecting a match on the identifier.

12. The renamer as recited in claim 1 wherein the respective renameable resource comprises a register.

13. The renamer as recited in claim 12 wherein the register is an architected register specified in an instruction set architecture of a processor.

14. A processor comprising:
a scheduler comprising a buffer configured to store a plurality of instruction operations to be issued for execution in the processor, wherein each of the plurality of instruction operations is identified by a corresponding identifier that locates the instruction in the buffer; and
a mapper coupled to the scheduler, wherein the mapper comprises a renamer configured to map each register to a respective identifier of a youngest instruction operation in the scheduler that writes the register, and wherein the renamer is coupled to receive an input from the scheduler representing one or more retiring instruction identifiers corresponding to instruction operations that are committing their results to architected state of the processor, and wherein an encoded form of the identifiers is logically divided into a plurality of fields, and wherein the input comprises a first plurality of bit vectors, wherein each of the first plurality of bit vectors corresponds to a respective field of the plurality of fields and includes a bit position for each possible value of the respective field, and wherein the renamer is configured to detect a match between a first identifier in the renamer and one of the retiring instruction identifiers, wherein detecting the match comprises detecting a set bit in the same bit position of one of the first plurality of bit vectors and a corresponding one of a second plurality of bit vectors, wherein the second plurality of bit vectors correspond to the first identifier, and wherein a first bit vector of the first plurality of bit vectors comprises a mask having set bits for each of the retiring instruction identifiers, and wherein each retiring instruction identifier corresponds to a different instruction operation that is committing its result to architected state.

15. The processor as recited in claim 14 wherein a second bit vector of the first plurality of bit vectors identifies a group within the buffer, and wherein the mask identifies the locations within the group of the retiring instruction operations.

16. The processor as recited in claim 14 wherein the scheduler is configured to flush the renamer by providing the first plurality of bit vectors with each bit in the plurality of bit vectors set.

17. A method performed by a hardware renamer circuit comprising:
receiving an input representing one or more retiring instruction identifiers corresponding to instruction operations that are committing their results to architected state, and wherein an encoded form of the identifiers is logically divided into a plurality of fields, and wherein the input comprises a first plurality of bit vectors, wherein each of the first plurality of bit vectors corresponds to a respective field of the plurality of fields and includes a bit position for each possible value of the respective field; and
detecting a match between a first identifier in the renamer and one of the retiring instruction identifiers, the detecting comprising detecting a set bit in the same bit position of one of the first plurality of bit vectors and a corresponding one of a second plurality of bit vectors, wherein the second plurality of bit vectors correspond to the first identifier, and wherein a first bit vector of the first plurality of bit vectors comprises a mask having set bits for each of the retiring identifiers, and wherein each retiring instruction identifier corresponds to a different instruction operation that is committing its result to architected state.

18. The method as recited in claim 17 wherein a second bit vector of the first plurality of bit vectors is a one hot vector.

19. The method as recited in claim 18 wherein each of the second plurality of bit vectors are one hot vectors.

* * * * *